(12) United States Patent
Veeramani et al.

(10) Patent No.: US 10,620,786 B2
(45) Date of Patent: Apr. 14, 2020

(54) TECHNOLOGIES FOR EVENT NOTIFICATION INTERFACE MANAGEMENT

(71) Applicant: Intel Corporation, Santa Clara, CA (US)

(72) Inventors: Karthik Veeramani, Hillsboro, OR (US); Ujwal Paidipathi, Beaverton, OR (US); Ashish Singhi, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 892 days.

(21) Appl. No.: 15/063,092

(22) Filed: Mar. 7, 2016

(65) Prior Publication Data

US 2017/0255345 A1 Sep. 7, 2017

(51) Int. Cl.
| | |
|---|---|
| G06F 3/0482 | (2013.01) |
| G06F 3/0481 | (2013.01) |
| G06F 11/00 | (2006.01) |
| H04N 21/00 | (2011.01) |
| G06F 3/0484 | (2013.01) |

(52) U.S. Cl.
CPC .......... G06F 3/0482 (2013.01); G06F 3/0481 (2013.01); G06F 3/04842 (2013.01); G06F 11/00 (2013.01); H04N 21/00 (2013.01)

(58) Field of Classification Search
CPC ...... G06F 3/0482; G06F 11/00; G06F 3/0481; G06F 3/04842; H04N 21/00
See application file for complete search history.

(56) References Cited

U.S. PATENT DOCUMENTS

| 8,554,282 B2 | 10/2013 | Chang | |
|---|---|---|---|
| 2002/0010922 A1* | 1/2002 | Darin | H04N 5/44543 725/32 |

(Continued)

OTHER PUBLICATIONS

International search report for PCT application No. PCT/2017-016198, dated May 11, 2017 (3 pages).

(Continued)

*Primary Examiner* — Jennifer N To
*Assistant Examiner* — Amy P Hoang
(74) *Attorney, Agent, or Firm* — Barnes & Thornburg LLP

(57) ABSTRACT

Technologies for managing event notifications on an interface of a display of a destination computing device include a plurality of source computing devices wirelessly coupled to the destination computing device via digital content communication channels usable to receive digital content streams from each of the source computing devices and event communication channels usable to receive one or more event notifications from one or more of the source computing devices. The destination computing device is configured to output the received event notifications to an interface of the display to a user, as well as any graphical user interface (GUI) control elements associated with actionable responses of the received event notifications. The destination computing device is further configured to detect selection of the GUI control elements and initiate a response/action associated with a selected GUI control element. Other embodiments are described and claimed herein.

19 Claims, 7 Drawing Sheets

(56) References Cited

U.S. PATENT DOCUMENTS

| | | | |
|---|---|---|---|
| 2004/0034873 A1* | 2/2004 | Zenoni | H04N 7/17318 725/135 |
| 2004/0205698 A1* | 10/2004 | Schliesmann | H04N 5/44513 717/106 |
| 2005/0086688 A1* | 4/2005 | Omoigui | H04H 60/33 725/35 |
| 2010/0079670 A1 | 4/2010 | Frazier et al. | |
| 2010/0109868 A1* | 5/2010 | Berger | G06F 3/04847 340/540 |
| 2013/0285937 A1 | 10/2013 | Billings et al. | |
| 2014/0009394 A1* | 1/2014 | Lee | H04N 5/4403 345/157 |
| 2015/0212675 A1 | 7/2015 | Firstenberg et al. | |

OTHER PUBLICATIONS

Written opinion for PCT application No. PCT/2017-016198, dated May 11, 2017 (6 pages).

\* cited by examiner

| EVENT NOTIFICATION INTERFACE | | |
|---|---|---|
| EVENT ID | DESCRIPTION OF EVENT | ACTIONABLE RESPONSES |
| 411 | MOTION DETECTED | PTZ ▼ | RECORD | ⓧ |
| 911 | *ALARM TRIGGERED* | DISABLE | PTZ/REC | ⓧ |
| 008 | LOW POWER DETECTED | EMAIL | ⓧ |
| 100 | ACCESS CARD NO. X SCANNED | | ⓧ |
| | | |
| | | |

FIG. 7

TECHNOLOGIES FOR EVENT NOTIFICATION INTERFACE MANAGEMENT

BACKGROUND

Traditionally, playback of digital content (e.g., movies, music, pictures, games, etc.) has been constrained to the computing device (e.g., desktop computer, smartphone, tablet, wearable, gaming system, television, etc.) on which the digital content is stored. However, with the advent of cloud computing related technologies and increased capabilities of computing devices, services such as digital content transmission services (i.e., streaming, casting, mirroring, etc.) have spurred along the generation, sharing, and consumption of digital content as consumer devices capable of interacting with such have become ubiquitous. The desire to share digital content between consumer interfacing computing devices, such as in home, office, and classroom environments, is increasing in tandem with the increased exposure of consumers to the digital content and providers of such digital content.

The introduction of stream-enabled computing devices has enabled digital content to be streamed, casted, or mirrored from one computing device (e.g., a smartphone, a laptop, etc.) to one or more other compatible computing devices (e.g., laptops, tablets, wearables, smart televisions, speakers, etc.) directly, or indirectly, such as via a compatible hub, dongle, etc., connected to the other computing device. In other words, digital content stored on one or more source computing devices can be transmitted to a single destination computing device, at which the received digital content (i.e., digital content stream) can be decoded, composed, and rendered for output to a display. Additionally, the increased compute capabilities have enabled multiple computing devices to be controlled by a single computing device, such as via screen sharing/casting from multiple transmitters to a single receiver. Typically, the digital content and or display screen is output to multiple displays areas in a predetermined display configuration, such as in a side-by-side arrangement, a tile arrangement, etc. However, a viewer can typically only devote their attention to one of the display areas in the display configuration at any given time.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 7 is an illustration of at least one embodiment of an event notification list that may be displayed in the event notification interface portion of a display of the destination computing device of FIGS. 1-3.

DETAILED DESCRIPTION OF THE DRAWINGS

Figure 1:
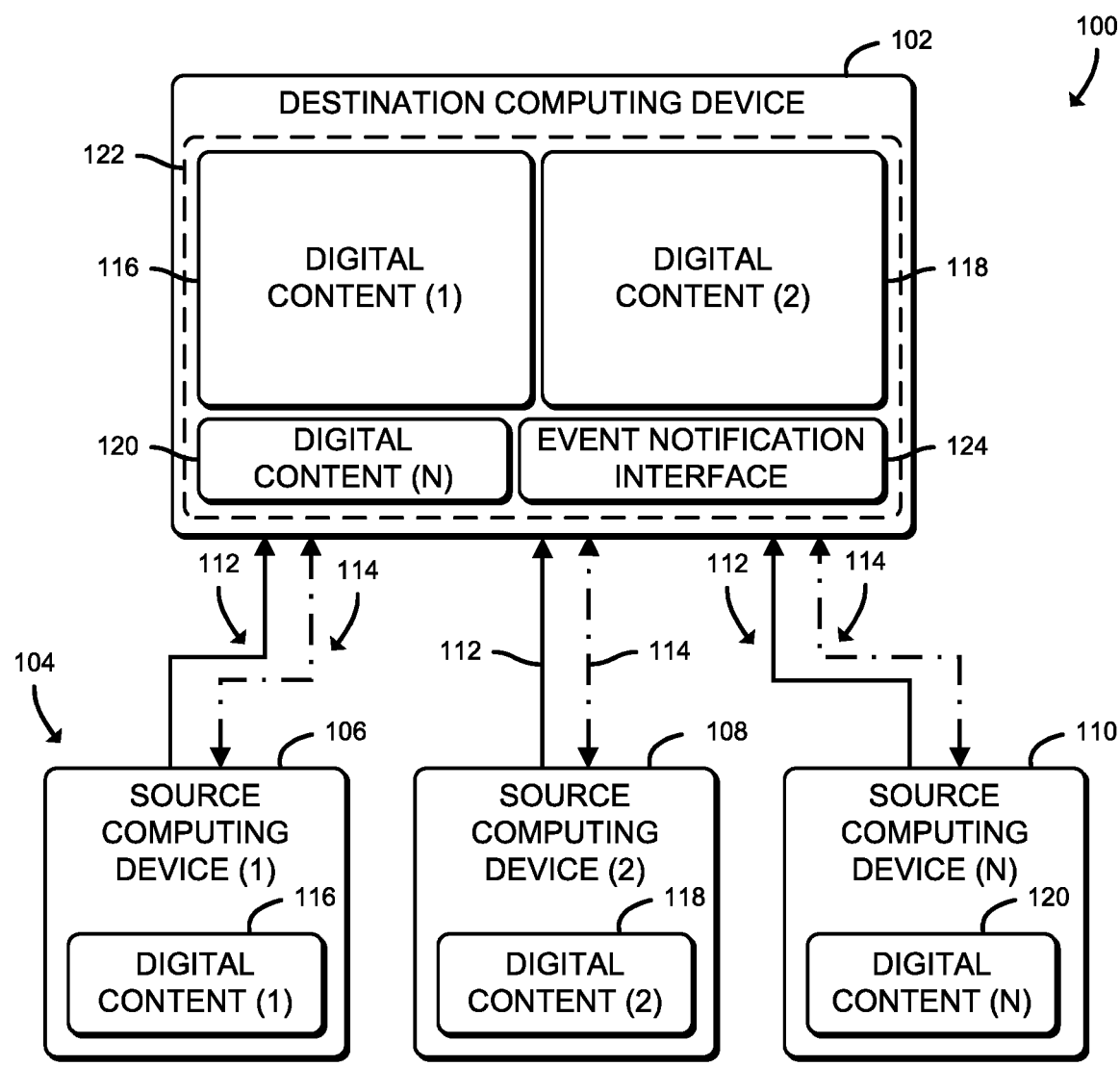
FIG. 1 is a simplified block diagram of at least one embodiment of a system for managing event notifications in an interface of a destination computing device wirelessly coupled to multiple source computing devices.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for managing a user interface 122 of a destination computing device 102 includes multiple source computing devices 104 wirelessly coupled to the destination computing device 102. In use, one or more of the source computing devices 104 transmits (e.g., casts, streams, mirrors, etc.) a digital content stream that may include any type of digital content (e.g., images, video, voice, audio, text, data, etc.) to the destination computing device 102. To do so, the destination computing device 102 (i.e., the digital content receiver) establishes a digital content communication channel 112 with each of the source computing devices 104 (i.e., the digital content transmitters), such that digital content (e.g., a screen of one of the source computing devices 104, frames of a video stored on one of the source computing devices 104, etc.) may be transmitted from the source computing devices 104 to the destination computing device 102 via the digital content communication channels 112.

The destination computing device 102 is configured to receive each of the digital content streams from the source computing devices 104, perform any processing that might be required on the digital content streams, and output the processed digital content to an output device (e.g., a display, a speaker, etc.) of the destination computing device 102. To do so, the destination computing device 102 is configured to receive the digital content streams from each of the source computing devices 102 and process (e.g., depacketize, extract payloads, parse headers, filter, reduce noise, decode, transcode, compose, render, etc.) the received digital content of the digital content streams based on one or more digital content properties. The digital content properties may include any properties related to the transmission of the digital content, as well as any properties of the digital content itself, usable by the destination computing device 102 to process the digital content and output the processed digital content. It should be appreciated that the digital content is typically transmitted such that it can be output in the same condition in which the digital content was captured (i.e., recorded, saved, etc.). Accordingly, the digital content properties may include encoder information (e.g., standard, version, etc.), file container/wrapper information, protocol information, etc., as well as a frame rate, an aspect ratio, a bit rate, a data rate, a sample rate, a resolution, and the like.

To output the processed digital content to an output device of the destination computing device 102, the destination computing device 102 is further configured to output (e.g., output to a display of the destination computing device 102, output to a speaker of the destination computing device 102, etc.) the processed digital content streams based on one or more output settings for each of the digital content streams as may be directed by a user of the destination computing device 102. The output settings may include any settings defining how the destination computing device 102 is to output the processed digital content to an output device (e.g., a display, a speaker, etc.) of the destination computing device 102, such as an audio output setting (e.g., a sample rate, an audio output volume level), a video output display layout/configuration setting, a video display setting (e.g., a resolution, a color depth, a color space, a refresh rate, an aspect ratio, etc.), and/or any other output settings.

In some embodiments, the video output display layout/configuration settings may include any information defining the display of one or more of the video outputs, such as a maximum number of video outputs to display, which digital content streams are active (i.e., presently selected for output), a location/region (i.e., relative to the bounds of the display) on which to display each of the active digital content streams, etc. Accordingly, in some embodiments, the output settings may be based on a current configuration of one or more output devices (e.g., displays, speakers, etc.) of the destination computing device 102. Additionally, in some embodiments, one or more of the output settings may be based on an instruction (i.e., input) received from a user of the destination computing device 102 (i.e., via a user-adjustable digital content output setting).

Additionally, the destination computing device 102 is configured to establish an event communication channel 114 with each of the source computing devices 104, such that data other than the digital content (e.g., event notifications, control data, etc.) may be transmitted from the source computing devices 104 to the destination computing device 102 via the event communication channels 114. Accordingly, it should be appreciated that the data communicated between the source computing devices 104 and the destination computing device 102 via the event communication channels 114 is distinct from the digital content received by the destination computing device 102 via the digital content communication channels 112. As such, the destination computing device 102 may establish the event communication channels 114 out-of-band, such as via a transmission control protocol (TCP) link. For example, the source computing devices 104 can transmit event notifications (i.e., notifications of events occurring on a particular one of the source computing devices 104) to the destination computing device 102 and receive event notification responses from the destination computing device 102 via the event communication channels 114 without interruption of the digital content transmission/reception.

Figure 2:
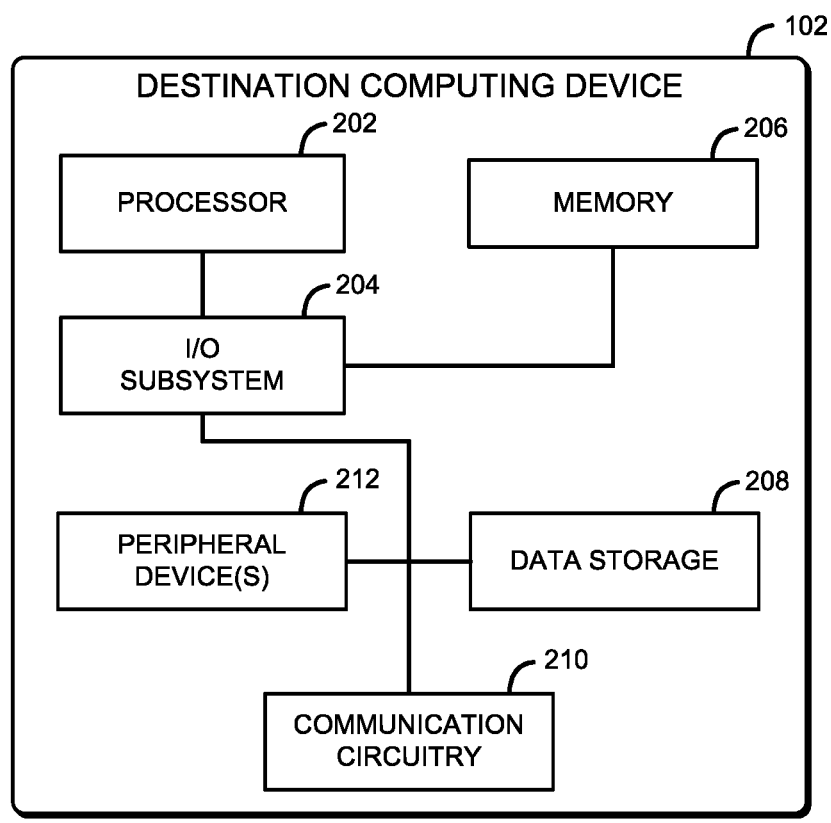
FIG. 2 is a simplified block diagram of at least one embodiment of the destination computing device of the system of FIG. 1.

The destination computing device 102 may be embodied as any type of computing device that is capable of performing the functions described herein, such as, without limitation, a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability, a computer, a smart television, a projector, a speaker, a connected entertainment system, a processor-based system, a multiprocessor system, and/or any other computing/communication device. As shown in FIG. 2, the illustrative destination computing device 102 includes a processor 202, an input/output (I/O) subsystem 204, a memory 206, a data storage device 208, communication circuitry 210, and one or more peripheral devices 212. Of course, in other embodiments, the destination computing device 102 may include other or additional components, such as those commonly found in a computing device. Further, in some embodiments, one or more of the illustrative components may be omitted from the destination computing device 102. Additionally, in some embodiments, one or more of the illustrative components may be incorporated in, or otherwise form a portion of, another component. For example, the memory 206, or portions thereof, may be incorporated in the processor 202, in some embodiments.

The processor 202 may be embodied as any type of processor capable of performing the functions described herein. For example, the processor 202 may be embodied as a single or multi-core processor(s), digital signal processor, microcontroller, or other processor or processing/controlling circuit. The memory 206 may be embodied as any type of volatile or non-volatile memory or data storage capable of performing the functions described herein. In operation, the memory 206 may store various data and software used during operation of the destination computing device 102, such as operating systems, applications, programs, libraries, and drivers.

The memory 206 is communicatively coupled to the processor 202 via the I/O subsystem 204, which may be embodied as circuitry and/or components to facilitate input/output operations with the processor 202, the memory 206, and other components of the destination computing device 102. For example, the I/O subsystem 204 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 204 may form a portion of a system-on-a-chip (SoC) and be incorporated, along with the processor 202, the memory 206, and/or other components of the destination computing device 102, on a single integrated circuit chip.

The data storage device 208 may be embodied as any type of device or devices configured for short-term or long-term storage of data, such as memory devices and circuits, memory cards, hard disk drives, solid-state drives, or other data storage devices, for example. It should be appreciated that the data storage device 208 and/or the memory 206 (e.g., the computer-readable storage media) may store various types of data capable of being executed by a processor (e.g., the processor 202) of the destination computing device 102, including operating systems, applications, programs, libraries, drivers, instructions, etc.

The communication circuitry 210 may be embodied as any communication circuit, device, or collection thereof, capable of enabling communications between the destination computing device 102 and the source computing devices 104 over a wireless communication channel (e.g., the digital content communication channels 112 of FIG. 1). For example, the communication circuitry 210 may include a network interface controller (NIC) and/or other devices capable of performing networking-related operations, which are not shown for clarity of the description. The communication circuitry 210 may be configured to use any one or more wireless communication technologies and associated protocols (e.g., Ethernet, Wi-Fi®, Bluetooth®, Bluetooth® Low Energy (BLE), near-field communication (NFC), Worldwide Interoperability for Microwave Access (Wi-MAX), Digital Living Network Alliance (DLNA), Intel® Wireless Display (WiDi), etc.) to affect such communication. The communication circuitry 210 may be additionally configured to use any one or more wireless and/or wired communication technologies and associated protocols to effect communication with other computing devices, such as over a network, for example.

The peripheral devices 212 may include any number of input/output devices, user interface devices, and/or other peripheral devices. For example, in some embodiments, the peripheral devices 212 may include a display, a touch screen, graphics circuitry, a keyboard, a mouse, a microphone, a speaker, and/or other input/output devices, interface devices, and/or peripheral devices. The particular devices included in the peripheral devices 212 may depend on, for example, the type and/or intended use of the destination computing device 102. The peripheral devices 212 may additionally or alternatively include one or more ports, such as a USB port, for example, for connecting external peripheral devices to the destination computing device 102.

Referring again to FIG. 1, the illustrative source computing devices 104 includes a first source computing device, designated as source computing device (1) 106, a second source computing device, designated as source computing device (2) 108, and a third source computing device, designated as source computing device (3) 110 (i.e., the "Nth" source computing device of the source computing devices 104, wherein "N" is a positive integer and designates one or more additional source computing devices 104). Additionally, the source computing device (1) 106 includes digital content (i.e., digital content (1) 116), the source computing device (2) 108 includes digital content (i.e., digital content (2) 118), and the source computing device (N) 110 includes digital content (i.e., digital content (N) 120). Each digital content 116, 118, 120 of the respective source computing devices 102 may include any data capable of being transmitted (e.g., streamed, casted, mirrored, etc.) to the destination computing device 10, such as a display of the source computing devices 104 (e.g., the entire display, a portion of the display, etc.), a digital content file stored local to the of the source computing devices 104 (e.g., a video file, an audio file, a text file, a combination thereof, etc.), etc.

As shown in FIG. 1, the user interface 122 (i.e., at least a portion of a display of the destination computing device 102) includes the digital content (1) 116 and the digital content (2) 118 in a side-by-side view, while the digital content (N) 120 is shown in a minimized portion of the user interface 122. In other words, the content data being transmitted from the source computing devices 104 is being displayed on at least a portion of the user interface 122. It should be appreciated that the portion of the user interface 122 in which the digital content is output depends on one or more output settings. Such output settings may include any data that defines how/whether the digital content is output, such as an output display configuration (e.g., the number of outputs, the position of each of the outputs relative to the user interface 122, the portion of the user interface 122 allocated to each of the outputs), which digital content streams are active (i.e., presently selected for output), as well as video output settings (e.g., resolution, aspect ratio, frame rate, bit rate, font, etc.), audio output settings (e.g., a sample rate, an audio output volume level), etc. The illustrative user interface 122 additionally includes an event notification interface 124 in which to display event notifications received from the source computing devices 102, described further below.

The source computing devices 104 may be embodied as any type of computing device that is capable of performing the functions described herein, such as, without limitation, a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability, a computer, a smart appliance, a smart television, a connected entertainment system, an internet protocol (IP) camera, a processor-based system, a multiprocessor system, and/or any other computing/communication device. It should be appreciated that the source computing devices 104 may include like components to those of the illustrative destination computing device 102 of FIG. 2. As such, further descriptions of the like components are not repeated herein with the understanding that the description of the corresponding components provided above in regard to the illustrative destination computing device 102 of FIG. 2 applies equally to the corresponding components of the source computing devices 104.

Each of the digital content communication channels 112 between the destination computing device 102 and the source computing devices 104 may be embodied as any type of wireless interconnection that may be established using any one or more wireless communication technologies (e.g., Ethernet, Wi-Fi®, Wi-Fi Direct®, Bluetooth®, BLE, NFC, etc.) and associated protocols (e.g., Miracast). Similarly, each of the event communication channels 114 between the destination computing device 102 and the source computing devices 104 may be embodied as any type of wireless interconnection that may be established using any one or more wireless communication technologies (e.g., Ethernet, Wi-Fi®, Wi-Fi Direct®, Bluetooth®, BLE, NFC, etc.) and associated protocols. Accordingly, the digital content communication channels 112 and the event communication channels 114 are usable by the destination computing device 102 and the source computing devices 104 to transmit data therebetween, as described herein.

Figure 3:
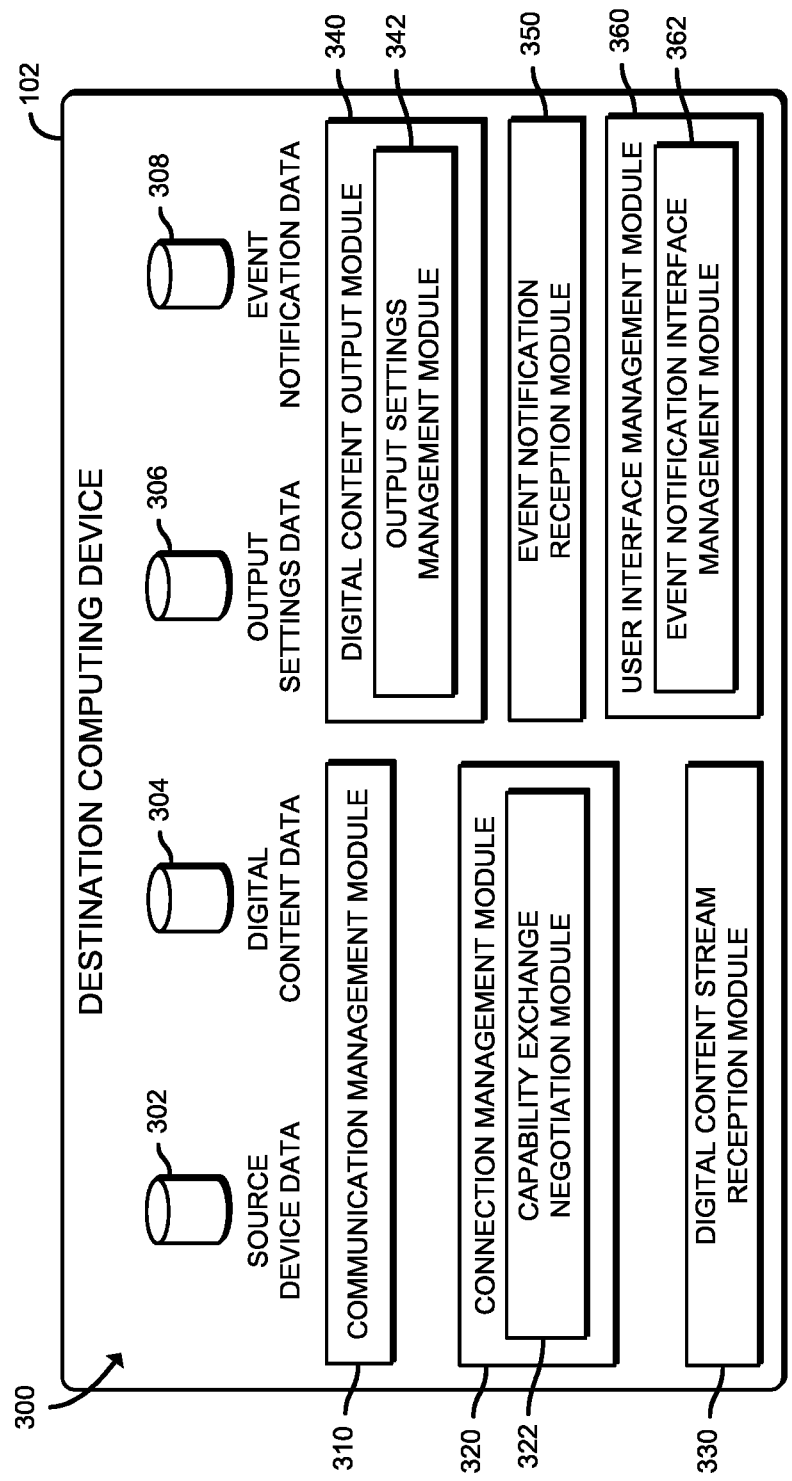
FIG. 3 is a simplified block diagram of at least one embodiment of an environment of the destination computing device of FIGS. 1 and 2.

Referring now to FIG. 3, in an illustrative embodiment, the destination computing device 102 establishes an environment 300 during operation. The illustrative environment 300 includes a communication management module 310, a connection management module 320, a digital content stream reception module 330, a digital content output module 340, an event notification reception module 350, and a user interface management module 360. The various modules of the environment 300 may be embodied as hardware, firmware, software, or a combination thereof. As such, in some embodiments, one or more of the modules of the environment 300 may be embodied as circuitry or collection of electrical devices (e.g., a communication management circuit 310, a connection management circuit 320, a digital content stream reception circuit 330, a digital content output circuit 340, an event notification reception circuit 350, a user interface management circuit 360, etc.).

It should be appreciated that, in such embodiments, one or more of the communication management circuit 310, the connection management circuit 320, the digital content stream reception circuit 330, the digital content output circuit 340, the event notification reception circuit 350, and the user interface management circuit 360 may form a portion of one or more of the processor 202, the I/O subsystem 204, and/or other components of the destination computing device 102. Additionally, in some embodiments, one or more of the illustrative modules may form a portion of another module and/or one or more of the illustrative modules may be independent of one another. Further, in some embodiments, one or more of the modules of the environment 200 may be embodied as virtualized hardware components or emulated architecture, which may be established and maintained by the processor 202 or other components of the destination computing device 102.

In the illustrative environment 300, the destination computing device 102 further includes source device data 302, digital content data 304, output settings data 306, and event notification data 308, each of which may be stored in the memory 206 and/or the data storage device 208 of the destination computing device 102. Further, each of the source device data 302, the digital content data 304, the output settings data 306, and/or the event notification data 308 may be accessed by the various modules and/or sub-modules of the destination computing device 102. Additionally, it should be appreciated that the data stored in, or otherwise represented by, each of the source device data 302, the digital content data 304, the output settings data 306, and/or the event notification data 308 may not be mutually exclusive relative to each other in some embodiments. For example, in some implementations, data stored in the source device data 302 may also be stored as a portion of the digital content data 304, and/or vice versa. As such, although the various data utilized by the destination computing device 102 is described herein as particular discrete data, such data may be combined, aggregated, and/or otherwise form portions of a single or multiple data sets, including duplicative copies, in other embodiments. It should be further appreciated that the destination computing device 102 may include additional and/or alternative components, sub-components, modules, sub-modules, and/or devices commonly found in a computing device, which are not illustrated in FIG. 3 for clarity of the description.

The communication management module 310, which may be embodied as hardware, firmware, software, virtualized hardware, emulated architecture, and/or a combination thereof as discussed above, is configured to facilitate inbound and outbound wireless network communications (e.g., network traffic, network packets, network flows, etc.) to and from the destination computing device 102. To do so, the communication management module 310 is configured to receive and process network packets from other computing devices (e.g., the source computing devices 104 and/or other computing device(s) communicatively coupled to the destination computing device 102). Additionally, the communication management module 310 is configured to prepare and transmit network packets to another computing device (e.g., the source computing devices 104 and/or other computing device(s) communicatively coupled to the destination computing device 102). To do so, the communication management module 310 is configured to establish communication channels with each of the communicatively coupled computing devices. Accordingly, in some embodiments, at least a portion of the functionality of the communication management module 310 may be performed by the communication circuitry 210 of the destination computing device 102, or more specifically by a network interface controller (NIC) of the communication circuitry 210.

The connection management module 320, which may be embodied as hardware, firmware, software, virtualized hardware, emulated architecture, and/or a combination thereof as discussed above, is configured to manage the active connections (i.e., wireless communication channels) between the destination computing device 102 and the source computing devices 104, such as a digital content transmission channel (e.g., the digital content communication channels 112) and an out-of-band communication exchange channel (e.g., the event communication channels 114), as well as any other wireless communication channels needed to establish/maintain the connection therebetween. Accordingly, during the connection process, the destination computing device 102 may collect connection information such as an IP address, a port number, access credentials, a session key, etc., as well as other identifying information of the source computing devices 104. In some embodiments, the connection information may be stored in the source device data 302 and retrieved for future use, such as upon establishing connections to those source computing devices 104 that the destination computing device 102 has been previously connected to.

The illustrative connection management module 320 includes a capability exchange negotiation module 322. It should be appreciated that the capability exchange negotiation module 322 of the connection management module 320 may be separately embodied as hardware, firmware, software, virtualized hardware, emulated architecture, and/or a combination thereof. For example, the capability exchange negotiation module 322 may be embodied as a hardware component in some embodiments, and embodied as a virtualized hardware component or as some other combination of hardware, firmware, software, virtualized hardware, emulated architecture, and/or a combination thereof in other embodiments.

The capability exchange negotiation module 322 is configured to perform a capability exchange with the source computing devices 104 upon establishment of the connection. For example, the capability exchange negotiation module 322 may be configured to generate a message for transmission to the source computing devices 104 that indicates one or more digital content output capabilities of the destination computing device 102, such as supported video codecs, supported resolutions, network port numbers, etc. Accordingly, the source computing devices 104 may take appropriate action on the digital content stream prior to transmission (e.g., encode the digital content stream using an encoder compatible with a decoder on the destination computing device 102).

In some embodiments, the capability exchange negotiation module 322 may be additionally configured to determine component capability information of the source computing devices 102 during the capability exchange. Such component capability information may include processor specifications (e.g., number of processor cores, clock speed, cache size, hyperthreading support, graphics processor specifications, etc.), memory specifications (e.g., total memory size, available memory size, etc.), power source/levels, and the like. In such embodiments, the component capability information may be additionally or alternatively stored in the source device data 302.

The digital content stream reception module 330, which may be embodied as hardware, firmware, software, virtualized hardware, emulated architecture, and/or a combination thereof as discussed above, is configured to receive the digital content streams associated with each of the source computing devices 104 presently transmitting a digital content stream to the destination computing device 102. To do so, the digital content stream reception module 330 is configured to receive the digital content stream(s) via the digital content communication channels 112 and perform any processing (e.g., depacketizing, extracting payloads, parsing headers, filtering, noise reduction, etc.) that may be required thereon. In some embodiments, data related to the digital content stream(s) may be stored in the digital content data 304.

The digital content output module 340, which may be embodied as hardware, firmware, software, virtualized hardware, emulated architecture, and/or a combination thereof as discussed above, is configured to process (e.g., decode, transcode, compose, render, etc.) and output (e.g., output video/text to a portion of a display of the destination computing device 102, output audio/voice to a speaker, etc.) the processed digital content. In some embodiments, data related to the processed digital content streams may be stored in the digital content data 304. To process and/or output the digital content streams, the digital content output module 340 may rely on one or more output settings.

As described previously, the output settings may include any data usable to output the digital content of the digital content stream, such as audio output settings (e.g., a sample rate, an audio output volume level, etc.), video output display layout/configuration settings, video display settings (e.g., resolution, color depth, color space, refresh rate, aspect ratio, frame rate, bit rate, data rate, etc.), etc. As also described previously, the video output display layout/configuration settings may include a maximum number of video outputs to display, which digital media streams are presently selected for output, a location/region relative to the bounds of the display on which to display each of the active digital media streams, etc.

Accordingly, the illustrative digital content output module 340 includes an output settings management module 342. It should be appreciated that the output settings management module 342 of the digital content output module 340 may be separately embodied as hardware, firmware, software, virtualized hardware, emulated architecture, and/or a combination thereof. For example, the output settings management module 342 may be embodied as a hardware component in some embodiments, and embodied as a virtualized hardware component or as some other combination of hardware, firmware, software, virtualized hardware, emulated architecture, and/or a combination thereof in other embodiments. The output settings management module 342 is configured to manage the output settings for each received digital content stream, such as may be directed by the source computing devices 104 and/or a user of the destination computing device 102. In some embodiments, the output settings may be stored in the output settings data 306.

The event notification reception module 350, which may be embodied as hardware, firmware, software, virtualized hardware, emulated architecture, and/or a combination thereof as discussed above, is configured to receive the event notifications from the source computing devices 104 (e.g., via the event communication channels 114). Such event notifications may indicate an alert that has been detected at one of the source computing devices 104. In some embodiments, the event notifications may include additional information, such as an event type (e.g., a descriptor of the event), an event description, an event priority level (e.g., informational, low, medium, high, critical, etc.), a detector of the event (e.g., the application that detected the event, the component that detected the event, etc.), and/or other metadata about the event.

Additionally, in some embodiments, one or more of the event notifications may include display information and/or one or more actionable responses. The display information may include data usable to display one or more GUI control elements (e.g., buttons, drop-down menus, checkboxes, etc.) in a portion of the user interface 122 in which the event notifications are displayed (e.g., visually displayed next to the corresponding event information), such as a type of GUI control element to display, one or more colors (e.g., based on a state of the GUI control element, a priority of the event, a type of event, etc.) of the GUI control element, text to overlay on the GUI control element, a font (e.g., a font face, a font size, a font style, a font color, etc.) of the text, etc. The actionable responses may include any information that identifies an action to be taken upon selection of the identified GUI control element. Accordingly, the event notification reception module 350 may be configured to map actionable responses to events captured by the displayed GUI control elements (e.g., a mouse-down event, a left-click event, a selection event, etc.), such as may be used to trigger the actionable responses. Such information related to the event notifications may be stored in the event notification data 308, in some embodiments.

The user interface management module 360, which may be embodied as hardware, firmware, software, virtualized hardware, emulated architecture, and/or a combination thereof as discussed above, is configured to manage the user interface(s) between the user of the destination computing device 102 and the destination computing device 102 itself. Accordingly, in some embodiments, the user interface management module 360 may be configured to manage one or more graphical user interface (GUI) elements (i.e., output icons/visual GUI elements, GUI control elements configured to receive input from the user, etc.) that allow the user to view a present status of the event, take an action based on an interaction (e.g., a finger-press, a mouse click, etc.) with one or more of the components, display the digital content, etc.

The user interface management module 360 includes an event notification interface management module 362. It should be appreciated that the event notification interface management module 362 of the user interface management module 360 may be separately embodied as hardware, firmware, software, virtualized hardware, emulated architecture, and/or a combination thereof. For example, the event notification interface management module 362 may be embodied as a hardware component in some embodiments, and embodied as a virtualized hardware component or as some other combination of hardware, firmware, software, virtualized hardware, emulated architecture, and/or a combination thereof in other embodiments.

The event notification interface management module 362 is configured to manage a portion of the user interface 122 in which to display event notifications received from one or more source computing devices 104 (e.g., the event notification interface 124 of FIG. 1). In other words, the event notification interface management module 362 is configured to manage the display of received event notifications, and information relating thereto, in an event notification list (see, e.g., the GUI list element 700 of FIG. 7) in the event notification interface 124. Accordingly, information relating to the received event notifications can be displayed in the event notification list for review by a user of the destination computing device 102 (see, e.g., the event information 702 of FIG. 7).

As described previously, the display information may include any type of data usable to identify one or more GUI control elements (see, e.g., the GUI control elements 704 of FIG. 7) to be displayed in the event notification list. As also described previously, the display information may include a type of GUI control element to display, one or more colors (e.g., based on a state of the GUI control element, a priority of the event, a type of event, etc.) of the GUI control element, text to overlay on the GUI control element, a font (e.g., a font face, a font size, a font style, a font color, etc.) of the text, etc. Accordingly, the event notification interface management module 362 is further configured to render the GUI control elements based on the display information, such as may be contained in the additional information relating thereto. Similar to the actionable responses described above, the display settings may be set by a user local to the destination computing device 102 and/or received with the event notification (i.e., with the additional information).

As described previously, the event notifications may include actionable responses for each of the GUI control elements, which may be triggered based on a detected interaction with the GUI control elements. Accordingly, the event notification interface management module 362 is further configured to manage user interaction with the GUI list element and the GUI control elements. In other words, the event notification interface management module 362 is configured to detect the selection of the GUI list element and/or the GUI control elements. In response to detecting a selection of one of the GUI list elements and/or one of the GUI control elements, the event notification interface management module 362 is further configured to take a subsequent action. To do so, the event notification interface management module 362 may be configured to dismiss the event (i.e., remove the event information from the GUI list elements) or initiate a responsive action associated with (i.e., mapped to, assigned to, etc.) a selected GUI control element.

For example, the event notification interface management module 362 may be configured to initiate an action local to the destination computing device 102, such as to playback an audible file (e.g., a sound, a phrase, etc.) that may be associated with that particular event and the responsive action associated therewith. In another example, the event notification interface management module 362 may be configured to generate an event notification response in response to the GUI control element selection. In such embodiments, the event notification actionable responses may include an actionable response indication (e.g., a character, a string of characters, etc.) that is usable by the source computing devices 104 to determine which GUI control element was selected based on which actionable response was mapped to the GUI control element for which a selection event was captured. In other words, the event notification interface management module 362 is configured to generate a response usable by the source computing device to determine a user's intended response to the event notification (i.e., an action to take based on the selection of the GUI control element). It should be appreciated that such information may be based on information set by a user of the destination computing device 102 (e.g., locally stored in a settings table that lists events and associated actions/responses), based on an event management policy, and/or based on information (i.e., direction) received with the event notification.

In an illustrative example, the event notification interface management module 362 may be configured to alert to reposition (i.e., pan, tilt, zoom, etc.) the field of view of one or more access control system cameras to focus on a location of the event (e.g., an unauthorized request for entry, a swipe of a smartcard, an unauthorized login, etc.) and/or initiate recording of one or more of the access control system cameras in response to selection of a particular GUI control element. Similarly, the event notification interface management module 362 may be configured to output an audio file in response to selection of a particular GUI control element. In another illustrative example, the event notification interface management module 362 may be configured to perform a task (e.g., perform an automated task, initiate a remote shutdown, enter into a power save mode, etc.).

Figure 4:
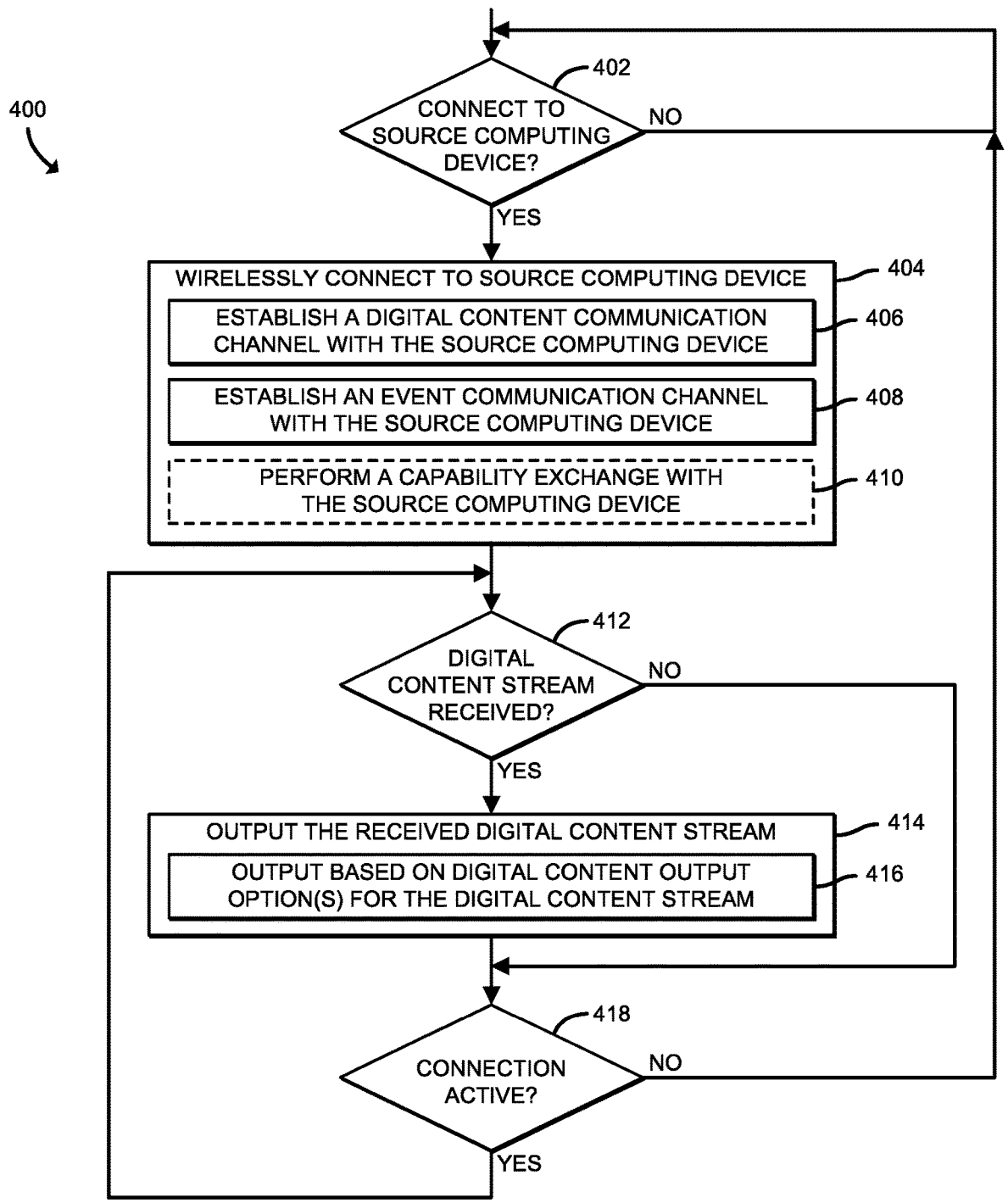
FIG. 4 is a simplified flow diagram of at least one embodiment for connecting to the source computing devices of the system of FIG. 1 that may be executed by the destination computing device of FIGS. 1-3.

Referring now to FIG. 4, in use, the destination computing device 102 may execute a method 400 for connecting to a source computing device (e.g., one of the source computing devices 104 of FIG. 1). The method 400 begins in block 402, in which the destination computing device 102 determines whether to connect to a source computing device. If so, the method 400 advances to block 402, in which the destination computing device 102 wirelessly connects to the source computing device. To do so, in block 406, the destination computing device 102 establishes a digital content communication channel (e.g., one of the digital content communication channels 112 of FIG. 1) with the source computing device. Additionally, in block 408, the destination computing device 102 establishes an event communication channel (e.g., one of the event communication channels 114 of FIG. 1) with the source computing device. In some embodiments, in block 410, the destination computing device 102 may additionally perform a capability exchange with each of the source computing devices during the connection process.

In block 412, the destination computing device 102 determines whether a digital content stream was received from source computing device that the destination computing device 102 connected to in block 402. If not, the method 400 advances to block 418, which is described below; otherwise, the method 400 proceeds to block 414. In block 414, the destination computing device 102 outputs the received digital content stream. To do so, in block 416, the destination computing device 102 outputs the received digital content stream based on one or more output settings for the digital content stream. It should be appreciated that the destination computing device 102 may process the received digital content stream prior to outputting the digital content stream.

In block 418, the destination computing device 102 determines whether the connection with the source computing device is still active. If not, the method 400 returns to block 402, in which the destination computing device 102 determines whether to connect to a source computing device. Otherwise, if the destination computing device 102 determines the connection with the source computing device is still active, the method 400 returns to block 412 to determine whether additional digital content has been streamed to the destination computing device 102.

Figure 5:
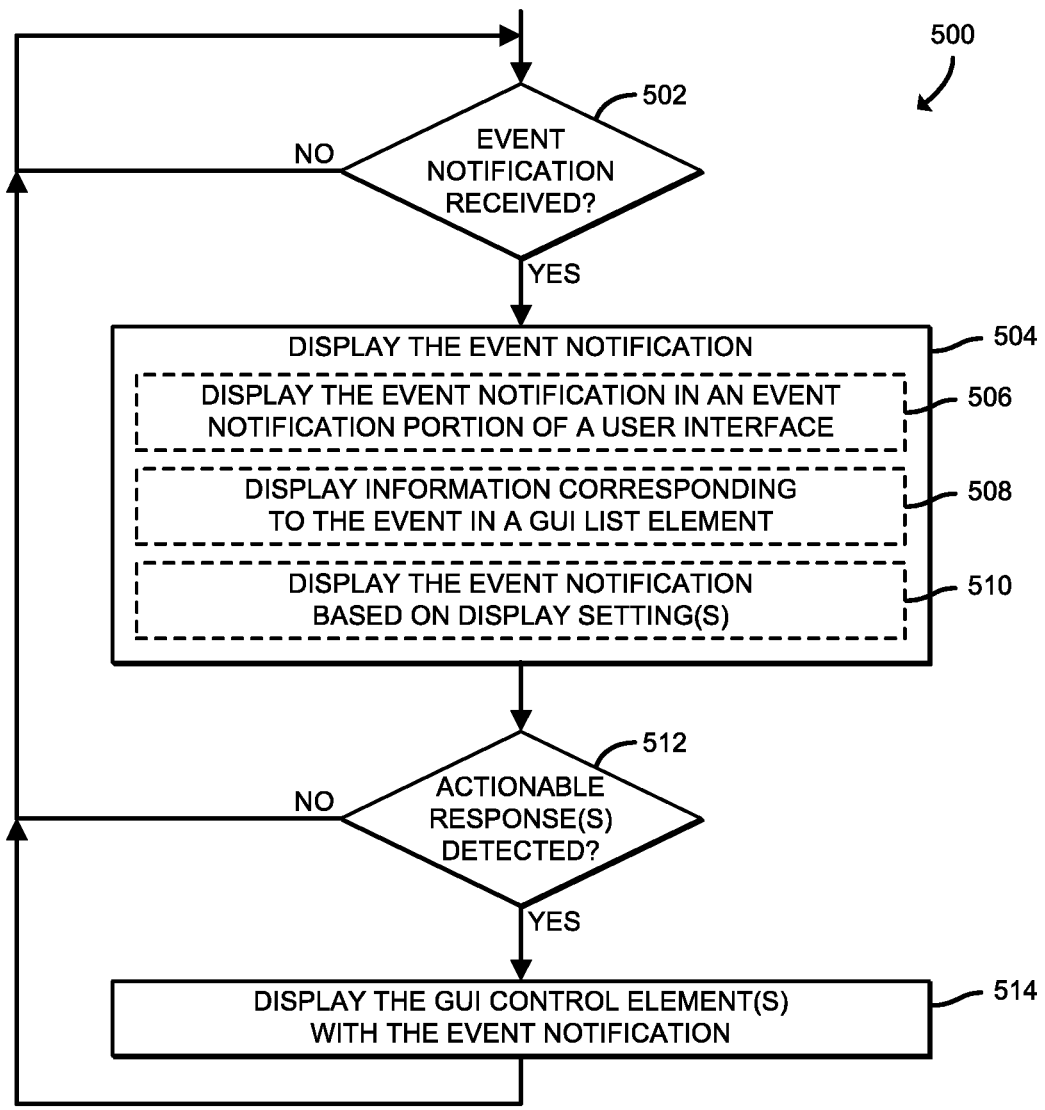
FIG. 5 is a simplified flow diagram of at least one embodiment for processing an event notification that may be executed by the destination computing device of FIGS. 1-3.

Referring now to FIG. 5, in use, the destination computing device 102 may execute a method 500 for processing an event notification received from a source computing device (e.g., one of the source computing devices 104 of FIG. 1). The method 500 begins in block 502, in which the destination computing device 102 determines whether an event notification has been received. If so, the method 500 advances to block 504, in which the destination computing device 102 displays the event notification. In some embodiments, in block 506, the destination computing device 102 displays the event notification in a predetermined portion (e.g., the event notification portion 124) of the user interface 122. Additionally, in some embodiments, in block 508, the destination computing device 102 displays information corresponding to the event notification (see, e.g., the event information 702 of FIG. 7) in a GUI list element (see, e.g., the GUI list element 700 of FIG. 7). In some embodiments, in block 510, the destination computing device 102 further displays the event notification information based on one or more display settings (e.g., a color, a font, effects, etc.) associated with the event of the event notification and/or the source computing device from which the event notification was received.

In block 512, the destination computing device 102 determines whether any actionable responses associated with the event notification have been detected. In other words, the destination computing device 102 determines whether to display one or more GUI elements in addition to the event notification information, such as may be based on the type of event and/or indicated in the event notification. As described previously, the event notification may include information usable to identify the event, as well as information usable to identify one or more icons/visual GUI elements (i.e., GUI control elements) that are to be displayed with the event notification (see, e.g., the GUI control elements 704 of FIG. 7). As also described previously, the event notification may additionally include additional information, such as text to be associated with the GUI control elements (e.g., text overlaid on a GUI button element), a font associated with the text, etc.

Figure 6:
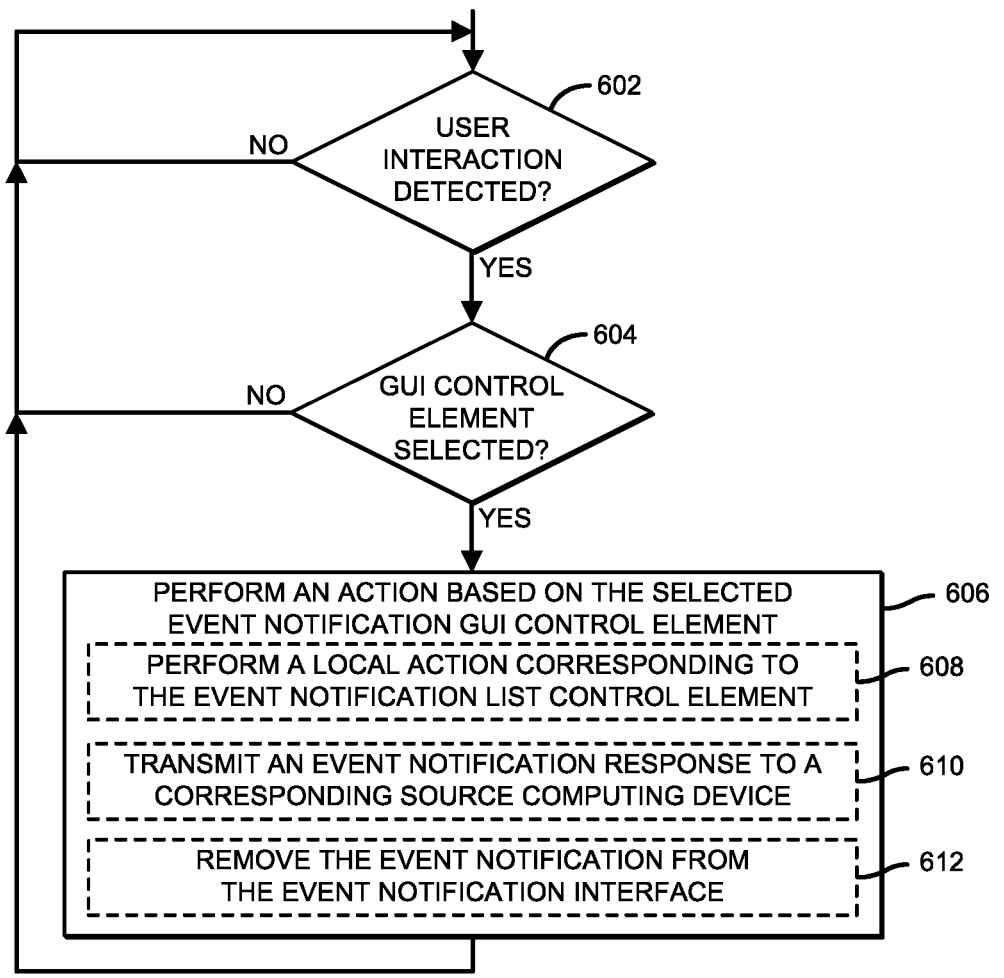
FIG. 6 is a simplified flow diagram of at least one embodiment for managing interactions between a user and an event notification interface that may be executed by the destination computing device of FIGS. 1-3.

Referring now to FIG. 6, in use, the destination computing device 102 may execute a method 600 for managing interactions between a user and an event notification list (see, e.g., the GUI list element 700 of FIG. 7) displayed in an event notification interface (e.g., the event notification interface 124 of FIG. 1), such as may be populated by the method 500 of FIG. 5. As described previously, the event notification list may include information relating to the event (see, e.g., the event information 702 of FIG. 7) as well as any GUI control elements (see, e.g., the GUI control elements 704 of FIG. 7) associated with the event. As also described previously, the GUI control elements can be monitored, such that a user-based interaction (e.g., a selection via a detected finger-press, mouse click, etc.) may trigger a responsive action associated with the with the selected GUI control element.

The method 600 begins in block 602, in which the destination computing device 102 determines whether user interaction with the event notification list has been detected. If so, the method 600 advances to block 604, in which the destination computing device 102 determines whether a GUI control element (i.e., one of the GUI control elements displayed with the event notification) was selected. If not, the method 600 returns to block 602, in which the destination computing device 102 determines whether another user interaction with the event notification interface 124 has been detected. Otherwise, if the destination computing device 102 determines a GUI control element was selected, the method 600 advances to block 606.

In block 606, the destination computing device 102 performs an action based on the GUI control element selected in block 604. As described previously, the one or more actionable responses received with the event notification may include information usable to identify a GUI control element to be displayed, as well as an event response (i.e., an action) associated with, or otherwise mapped to, that particular event notification which is to be triggered/initiated upon selection of the corresponding GUI control element. For example, in block 608, the destination computing device 102 may perform a local action corresponding to the event notification list GUI control element, such as by making a change to an output setting of the interface portion corresponding to the source computing device from which the event notification was received, opening a file, generating an email, etc.

In another example, in block 610, the destination computing device 102 may transmit an event notification response (e.g., based on the actionable response received with the event notification and used to identify the associated GUI control element selected in block 604) to a corresponding source computing device using an event communication channel that includes an actionable response indication (e.g., a character, a string of characters, etc.) that is usable by the source computing devices 104 to determine which GUI control element was selected. In still another example, in block 612, the destination computing device 102 may additionally or alternatively remove the event notification from the event notification list, such as may be triggered by another GUI element (see, e.g., the event dismissal GUI elements 706 of FIG. 7).

It should be appreciated that at least a portion of one or more of the methods 400, 500, and 600 may be embodied as various instructions stored on a computer-readable media, which may be executed by the processor 202, the communication circuitry 210, and/or other components of the destination computing device 102 to cause the destination computing device 102 to perform the methods 400, 500, and 600. The computer-readable media may be embodied as any type of media capable of being read by the destination computing device 102 including, but not limited to, the memory 206, the data storage device 208, a local memory of a NIC (not shown) of the communication circuitry 210, other memory or data storage devices of the destination computing device 102, portable media readable by a peripheral device of the destination computing device 102, and/or other media.

Referring now to FIG. 7, an illustrative event notification list 700 is shown that may be displayed in the event notification interface portion (e.g., the event notification interface 124 of FIG. 1) of the display of the destination computing device 102. As described previously, received event notifications may include data usable to generate an event notification item in an event notification list. As also described previously, the event notifications may include information usable to identify the event, as well as additional information usable to generate one or more GUI control elements, each of which may be mapped to a responsive action. Accordingly, the illustrative event notification list 700 includes event information 702, GUI control elements 704, and event dismissal GUI elements 706.

The event information 702 may display any information of the event notification received, such as an identifier or type of the event, a description of the event, a priority level of the event, a source that detected the event, and/or any other relevant data related to the event. The GUI control elements 704 may indicate an actionable response that a user may take upon selection of one of the GUI control elements 704, as well as facilitate the interaction between the user and the GUI control elements 704, such that selection thereof can initiate a desired response. For example, the illustrative GUI control elements 704 include a drop-down GUI element and a button GUI element. The event dismissal GUI elements 706 are a specific type of GUI control element that is usable to dismiss the event notification item from the event notification list 700.

Examples

Illustrative examples of the technologies disclosed herein are provided below. An embodiment of the technologies may include any one or more, and any combination of, the examples described below.

Example 1 includes a destination computing device for managing event notifications in an interface of the destination computing device, the destination computing device comprising a connection management module to (i) establish a digital content communication channel between the destination computing device and each of a plurality of source computing devices and (ii) establish an event communication channel between the destination computing device and each of the plurality of source computing devices; a digital content stream reception module to receive a plurality of digital content streams via each of the established digital content communication channels; an event notification reception module to receive one or more event notifications from one or more of the plurality of source computing devices via each of the established event communication channels; and a user interface management module to output the one or more received event notifications to an interface of a display of the destination computing device.

Example 2 includes the subject matter of Example 1, and wherein an event notification of the one or more event notifications includes one or more actionable responses associated with the event notification, and wherein the user interface management module is further to output a graphical user interface (GUI) control element to the interface for each of the one or more actionable responses.

Example 3 includes the subject matter of any of Examples 1 and 2, and wherein the user interface management module is further to (i) receive an indication that one of the GUI control elements was selected and (ii) initiate a responsive action associated with the selected GUI control element.

Example 4 includes the subject matter of any of Examples 1-3, and wherein to initiate the responsive action associated with the selected GUI control element comprises to perform a local action on the destination computing device based on the GUI control element selected.

Example 5 includes the subject matter of any of Examples 1-4, and wherein to initiate the responsive action associated with the selected GUI control element comprises to transmit an event notification response to a corresponding source computing device based on the GUI control element selected, wherein the event notification response includes an actionable response indication usable by the corresponding source computing device to determine which GUI control element has been selected.

Example 6 includes the subject matter of any of Examples 1-5, and wherein the actionable response indication includes a character or a string of characters.

Example 7 includes the subject matter of any of Examples 1-6, and wherein each of the established event communication channels is an out-of-band channel.

Example 8 includes the subject matter of any of Examples 1-7, and further including a digital content output module to (i) process each of the received digital content streams and (ii) output one or more of the processed digital content streams to a portion of the display of the destination computing device.

Example 9 includes the subject matter of any of Examples 1-8, and wherein to output the one or more of the received digital content streams comprises to output the one or more of the received digital content streams based on one or more output settings.

Example 10 includes the subject matter of any of Examples 1-9, and wherein to output the received event notifications to the interface of the display of the destination computing device comprises to output the received event notifications to an event notification list in an event notification portion of the interface.

Example 11 includes a method for managing event notifications in an interface of a destination computing device, the method comprising establishing, by a destination computing device, a digital content communication channel between the destination computing device and each of a plurality of source computing devices; establishing, by the destination computing device, an event communication channel between the destination computing device and each of the plurality of source computing devices; receiving, by the destination computing device, a plurality of digital content streams via each of the established digital content communication channels; receiving, by the destination computing device, one or more event notifications from one or more of the plurality of source computing devices via each of the established event communication channels; and outputting, by the destination computing device, the received event notifications to an interface of a display of the destination computing device.

Example 12 includes the subject matter of Example 11, and wherein receiving of the one or more event notifications comprises receiving one or more actionable responses with each of the one or more received event notifications, and further comprising outputting a graphical user interface (GUI) control element to the interface for each of the one or more actionable responses.

Example 13 includes the subject matter of any of Examples 11 and 12, and further including receiving, by the destination computing device, an indication that one of the GUI control elements was selected; and initiating, by the destination computing device, a responsive action associated with the selected GUI control element.

Example 14 includes the subject matter of any of Examples 11-13, and wherein initiating the responsive action associated with the selected GUI control element comprises performing a local action on the destination computing device based on the GUI control element selected.

Example 15 includes the subject matter of any of Examples 11-14, and wherein initiating the responsive action associated with the selected GUI control element comprises transmitting an event notification response to a corresponding source computing device based on the GUI control element selected, wherein the event notification response includes an actionable response indication usable by the corresponding source computing device to determine which GUI control element has been selected.

Example 16 includes the subject matter of any of Examples 11-15, and wherein the actionable response indication includes a character or a string of characters.

Example 17 includes the subject matter of any of Examples 11-16, and wherein receiving each of the one or more event notifications via the established event communication channels comprises receiving each of the one or more event notifications via out-of-band channels.

Example 18 includes the subject matter of any of Examples 11-17, and further including processing, by the destination computing device, each of the received digital content streams; and outputting, by the destination computing device, one or more of the processed digital content streams to a portion of the display of the destination computing device.

Example 19 includes the subject matter of any of Examples 11-18, and wherein outputting the one or more of the received digital content streams comprises outputting the one or more of the received digital content streams based on one or more output settings.

Example 20 includes the subject matter of any of Examples 11-19, and wherein outputting the received event notifications to the interface of the display of the destination computing device comprises outputting the received event notifications to an event notification list in an event notification portion of the interface.

Example 21 includes a destination computing device comprising a processor; and a memory having stored therein a plurality of instructions that when executed by the processor cause the destination computing device to perform the method of any of Examples 11-20.

Example 22 includes one or more machine readable storage media comprising a plurality of instructions stored thereon that in response to being executed result in a destination computing device performing the method of any of Examples 11-20.

Example 23 includes a destination computing device for managing event notifications in an interface of the destination computing device, the destination computing device comprising means for establishing a digital content communication channel between the destination computing device and each of a plurality of source computing devices; means for establishing an event communication channel between the destination computing device and each of the plurality of source computing devices; means for receiving a plurality of digital content streams via each of the established digital content communication channels; means for receiving one or more event notifications from one or more of the plurality of source computing devices via each of the established event communication channels; and means for outputting the received event notifications to an interface of a display of the destination computing device.

Example 24 includes the subject matter of Example 23, and wherein the means for receiving of the one or more event notifications comprises means for receiving one or more actionable responses with each of the one or more received event notifications, and further comprising means for outputting a graphical user interface (GUI) control element to the interface for each of the one or more actionable responses.

Example 25 includes the subject matter of any of Examples 23 and 24, and further including means for receiving an indication that one of the GUI control elements was selected; and means for initiating a responsive action associated with the selected GUI control element.

Example 26 includes the subject matter of any of Examples 23-25, and wherein the means for initiating the responsive action associated with the selected GUI control element comprises means for performing a local action on the destination computing device based on the GUI control element selected.

Example 27 includes the subject matter of any of Examples 23-26, and wherein the means for initiating the responsive action associated with the selected GUI control element comprises means for transmitting an event notification response to a corresponding source computing device based on the GUI control element selected, wherein the event notification response includes an actionable response indication usable by the corresponding source computing device to determine which GUI control element has been selected.

Example 28 includes the subject matter of any of Examples 23-27, and wherein the actionable response indication includes a character or a string of characters.

Example 29 includes the subject matter of any of Examples 23-28, and wherein the means for receiving each of the one or more event notifications via the established event communication channels comprises means for receiving each of the one or more event notifications via out-of-band channels.

Example 30 includes the subject matter of any of Examples 23-29, and further including means for processing each of the received digital content streams; and means for outputting one or more of the processed digital content streams to a portion of the display of the destination computing device.

Example 31 includes the subject matter of any of Examples 23-30, and wherein the means for outputting the one or more of the received digital content streams comprises means for outputting the one or more of the received digital content streams based on one or more output settings.

Example 32 includes the subject matter of any of Examples 23-31, and wherein the means for outputting the received event notifications to the interface of the display of the destination computing device comprises means for outputting the received event notifications to an event notification list in an event notification portion of the interface.

The invention claimed is:

1. A destination computing device for managing event notifications in an interface of the destination computing device, the destination computing device comprising:
   a connection management module to (i) establish a digital content communication channel between the destination computing device and each of a plurality of source computing devices and (ii) establish an event communication channel between the destination computing device and each of the plurality of source computing devices;

a digital content stream reception module to concurrently receive a plurality of digital content streams via each of the established digital content communication channels;

an event notification reception module to receive one or more event notifications from one or more of the plurality of source computing devices via each of the established event communication channels, wherein each of the one or more event notifications is indicative of an event of the corresponding source computing device, wherein an event notification of the one or more event notifications includes one or more actionable responses associated with the event notification; and a user interface management module to: (i) output the one or more received event notifications to an interface of a display of the destination computing device, (ii) output a graphical user interface (GUI) control element to the interface for each of the one or more actionable responses, (iii) receive an indication that one of the GUI control elements was selected, and (iv) initiate a responsive action associated with the selected GUI control element.

2. The destination computing device of claim 1, wherein to initiate the responsive action associated with the selected GUI control element comprises to perform a local action on the destination computing device based on the GUI control element selected.

3. The destination computing device of claim 1, wherein to initiate the responsive action associated with the selected GUI control element comprises to transmit an event notification response to a corresponding source computing device based on the GUI control element selected, wherein the event notification response includes an actionable response indication usable by the corresponding source computing device to determine which GUI control element has been selected.

4. The destination computing device of claim 3, wherein the actionable response indication includes a character or a string of characters.

5. The destination computing device of claim 1, further comprising a digital content output module to (i) process each of the received digital content streams and (ii) output one or more of the processed digital content streams to a portion of the display of the destination computing device.

6. The destination computing device of claim 1, wherein to output the received event notifications to the interface of the display of the destination computing device comprises to output the received event notifications to an event notification list in an event notification portion of the interface.

7. One or more non-transitory computer-readable storage media comprising a plurality of instructions stored thereon that in response to being executed cause a destination computing device to:

establish a digital content communication channel between the destination computing device and each of a plurality of source computing devices;

establish an event communication channel between the destination computing device and each of the plurality of source computing devices;

receive a plurality of digital content streams via each of the established digital content communication channels;

receive one or more event notifications from one or more of the plurality of source computing devices via each of the established event communication channels, wherein an event notification of the one or more event notifications includes one or more actionable responses associated with the event notification;

output the one or more received event notifications to an interface of a display of the destination computing device;

output a graphical user interface (GUI) control element to the interface for each of the one or more actionable responses;

receive an indication that one of the GUI control elements was selected; and initiate a responsive action associated with the selected GUI control element.

8. The one or more non-transitory computer-readable storage media of claim 7, wherein to initiate the responsive action associated with the selected GUI control element comprises to perform a local action on the destination computing device based on the GUI control element selected.

9. The one or more non-transitory computer-readable storage media of claim 7, wherein to initiate the responsive action associated with the selected GUI control element comprises to transmit an event notification response to a corresponding source computing device based on the GUI control element selected, wherein the event notification response includes an actionable response indication usable by the corresponding source computing device to determine which GUI control element has been selected.

10. The one or more non-transitory computer-readable storage media of claim 7, wherein to output the received event notifications to the interface of the display of the destination computing device comprises to output the received event notifications to an event notification list in an event notification portion of the interface.

11. A method for managing event notifications in an interface of a destination computing device, the method comprising:

establishing, by a destination computing device, a digital content communication channel between the destination computing device and each of a plurality of source computing devices;

establishing, by the destination computing device, an event communication channel between the destination computing device and each of the plurality of source computing devices;

receiving, by the destination computing device, a plurality of digital content streams via each of the established digital content communication channels;

receiving, by the destination computing device, one or more event notifications from one or more of the plurality of source computing devices via each of the established event communication channels;

receiving one or more actionable responses with each of the one or more received event notifications;

outputting, by the destination computing device, the received event notifications to an interface of a display of the destination computing device;

outputting a graphical user interface (GUI) control element to the interface for each of the one or more actionable responses;

receiving, by the destination computing device, an indication that one of the GUI control elements was selected; and initiating, by the destination computing device, a responsive action associated with the selected GUI control element, wherein initiating the responsive action associated with the selected GUI control element comprises performing a local action on the destination computing device based on the GUI control element selected.

12. The method of claim 11, wherein initiating the responsive action associated with the selected GUI control element comprises transmitting an event notification response to a corresponding source computing device based on the GUI control element selected, wherein the event notification response includes an actionable response indication usable by the corresponding source computing device to determine which GUI control element has been selected.

13. The method of claim 11, wherein the destination computing device and each of the plurality of source computing devices are in the same room.

14. The destination computing device of claim 1, wherein each of the plurality of digital content streams comprises screen data of the corresponding source computing device.

15. The destination computing device of claim 1, wherein each of the digital content communication channels and each of the event communication channels is embodied as a direct wireless connection without communication passing through an intermediate device.

16. The destination computing device of claim 1, wherein each of the digital content communication channels and each of the event communication channels is embodied as part of a local area network.

17. The destination computing device of claim 1, wherein to initiate the responsive action associated with the selected GUI control element comprises to transmit an event notification response to a corresponding source computing device based on the GUI control element selected, wherein the event notification response includes an instruction to reposition a field of view of a camera.

18. The destination computing device of claim 1, wherein to initiate the responsive action associated with the selected GUI control element comprises to transmit an event notification response to a corresponding source computing device based on the GUI control element selected, wherein the event notification response includes an instruction to adjust a setting of the corresponding source computing device.

19. The one or more non-transitory computer-readable storage media of claim 7, further comprising a second plurality of instructions stored thereon that, when executed by each of the plurality of source computing devices, causes each of the plurality of source computing devices to execute a screen sharing protocol over the corresponding digital content communication channel,
wherein the plurality of instructions further cause the destination computing device to:
receive, from each of the plurality of source computing devices, screen data sent as part of the screen sharing protocol;
select screen data corresponding to at least one of the plurality of source computing devices; and
display the selected screen data on a display of the destination computing device.

* * * * *